UNITED STATES PATENT OFFICE.

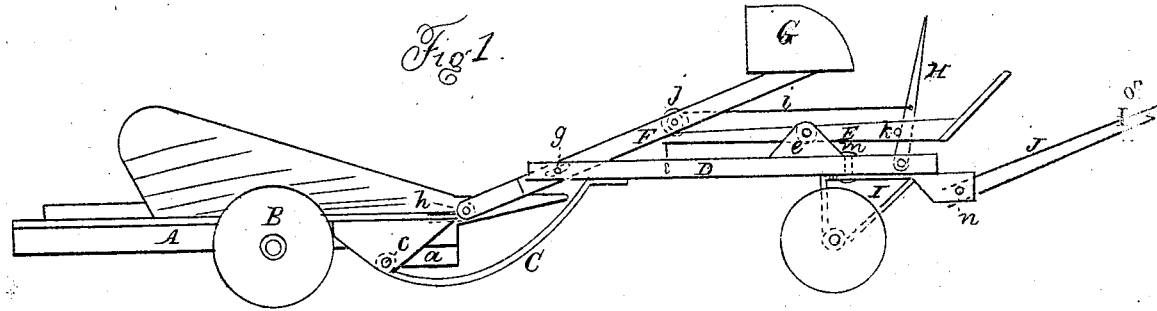
P. Manny.
Harvester Cutter.
No. 16445
Patented Jan. 20, 1857

PELLS MANNY, OF WADDAM'S GROVE, ILLINOIS.

IMPROVEMENT IN HARVESTERS.

Specification forming part of Letters Patent No. 16,445, dated January 20, 1857.

*To all whom it may concern:*

Be it known that I, PELLS MANNY, of Waddam's Grove, in the county of Stephenson and State of Illinois, have invented a certain new and useful improvement in arrangements for controlling the run and up-and-down play or adjustment of harvesters and their cutters, of which the following is a full, clear, and exact description, reference being had to the accompanying drawings, which form part of this specification, and in which—

Figure 1 represents a side elevation of a harvester-frame with its flexible-joint attachment of shoe, leading-board, and draft devices, including the driver's seat and mechanism for controlling the flexure of the machine; Fig. 2, a top view or plan of the same; and Fig. 3, a top view of a swiveling double caster that supports the "leading" portion, and to which the tongue or draft-bar is hinged.

It is one of the most important essentials in the construction of harvesting-machines, of whatever description, that an easy and flexible but steady run should be secured the machine, together with a ready adjustability, under the control of the driver, of the height of the cutter-bar or cutter-bar portion, to avoid obstructions in the path, meet varying inequalities of the ground, and to cut "long" or "close," as required. All previous arrangements, including those employing a leading-truck connected with the main frame by a flexible joint, have been more or less defective in these and other respects, and the various mechaincal devices of levers, &c., under the control of the driver for raising and lowering the cutter have failed to perform the duties required of them as perfectly as is desirble. In some of these latter the machine has been laggish in its flexure, and in others, especially those which have had the "flexible joint" arranged in the line of the cutter, the flexure has been too easy, too little weight has been thrown forward on the sickle-bar to keep it steady and prevent its undue rising in cutting heavy grain. Likewise a poor purchase for adjusting the cutter has been obtained, and the position of the joint has led to inconveniences in the construction of the machine. But the flexible joint has been so variously arranged, including its hang back of the finger-bar and between the finger-bar and driving-wheel, that it would occupy to much space to draw comparisons here of the advantages and disadvantages attendant upon mere position, nor is such to make known what constitutes my improvement necessary. It, however, should be borne in mind that the steady run of the machine, with facility for turning, to reduce the vibratory play produced by the action of the cutter, and the steady hold but ready adjustability of the cutter to or at any required height, are both of them necessary to secure a good cut and proper management of the cutter; and my improved arrangement, which I shall now proceed to describe in detail, accomplishes these results in the most perfect manner.

The main frame A, which carries the driving-wheel B, may be constructed in any suitable manner, the front strip, $a$, of it forming or carrying the finger-bar along, on or in front of which may be arranged the ordinary or any other reciprocating cutter.

The device which is known as the "elastic" shoe C in machines of this description, instead of being rigidly attached, as frequently the case, under the finger-bar, and having the leading mechanism hinged to said shoe in front of it, is here made elastic under the finger-bar, being attached by a joint, $c$, at the back of it to the frame behind the finger-bar and near the driving-wheel, said shoe C being rigidly attached at its front to the leading-board D. The leading-board D projects, as usual, in front, and carries a treadle, E, whose fulcrum $e$ is intermediate of its length, and its arrangement such that, on the driver depressing by his foot the front portion of the treadle, the back arm or portion of the treadle raises the front portion of a spring lever or beam, F, which carries the driver's seat G in front of it and plays on a fulcrum, $g$, in the rear portion of the leading-board D, and is connected at its back end by a joint, $h$, to the front portion of the main frame A. By this arrangement the driver's weight upon the spring-hung seat G raises, or has a tendency so to do, the front or finger-bar portion, $a$, of the main frame, and this of course elevates the cutter; but by pressure with his foot on the front portion of the treadle E, or rather by increased pressure with his feet thereon, he raises up the seat end of the spring beam or lever F, and so depresses the front end of the finger-bar, and consequently the cutter, as before specified; and in this way, accordingly as the driver throws weight on the seat or pressure on the treadle, is the cutter readily adjusted and held at its proper height without depriving him of the full use of his hands for the management of the reins and for throwing in and out of gear the automatic rake to make uniformly-sized gavels; and here a distinction should be drawn between this combined arrangement of the seat-lever F and foot-treadle E operating in reverse directions, as described, and distinct from any up-and-down play of the leading-board D, and other foot and hand lever devices for effecting a like adjustment; also, other arrangements, in one of which the driver's seat has been similarly connected by lever, so that the sitting-weight of the driver effected the lift of the front portion of the main frame, and accordingly as he increased pressure on the seat or transferred his weight by his feet onto the leading-board underneath (thereby taking off pressure from the seat) was the up-and-down adjustment of the main frame effected, and another arrangement in which the leading-board has been so hung and connected with the main frame that the driver in transferring his weight from his seat to the leading-board in front, and vice versa, has been enabled to effect the up-and-down adjustment of the main frame by his sitting-weight and foot-pressure, the leading-board acting as a treadle or lever to effect said adjustment, and its fulcrum being between its front or foot portion and the seat, which latter is rigidly supported on or by the leading-board; but these arrangements are inferior to that shown in the drawings accompanying this.

It is important for the proper action of the shoe C as here arranged and to secure a steady run of the guiding, turning, and carrying wheels in front that the leading-board D should be held as steady as possible, and not be used as a lever to effect the lift or depression of the main frame, which it could not well be here, and the combined actions of the seat-lever F and treadle E in this improved arrangement (the lever and treadle acting one upon the other and moving simultaneously in reverse directions) give a much better control of the main-frame adjustment, and as the tendency of the seat in lowering is to throw the driver forward any liability to his being pitched or thrown off suddenly by abrupt lowering of the seat and the horses starting off with a jerk, and from numerous causes, is counteracted by the quick backward and upward thrust of the foot-board of the treadle acting against the driver's feet in a reverse direction to keep him on the seat, and this without any serious tilting of the leading-board, while the rigid attachment of the elastic shoe C to the leading-board and its jointed attachment at its back to the main frame near the driving-wheel, taken in connection with the lever-lift of the driver's seat spring-beam F, as described, not only establishes a most perfect elastic but firm connection that eases the draft, &c. but forms a most convenient flexible-joint arrangement that gives a steady hold to the cutter with a most advantageous lift of it when required; and the up-and-down action in relation to each other of the shoe and front portion of the main frame during the varying adjustments of the latter prevents the elastic shoe C from choking up with dirt or cut particles, as is more or less the case in other arrangements, in which the shoe or guard has been similarly hinged between the finger-bar and driving-wheel, but either hinged also in front to the leading-board or supported by roller in front on the draft-bar with freedom of play lengthwise, or in which the shoe has been made a draft-connection by its jointed attachment at both ends, and in sundry others.

To prevent the front portion of the main frame, with its cutter, from dropping too low when the driver has occasion to leave his seat, a lever, H, is pivoted to the leading-board in front and caused to bear against an adjustable or fixed stop-pin, $k$, inserted in one side of the treadle by a cord or chain, $i$, attached at its one end to said lever H, passing over a pulley, $j$, on the front arm or portion of the spring lever or beam F, and connected at its other end to the leading-board D. If desired, the driver may at any time raise or assist in raising the cutter-bar portion of the frame by pressure of his foot against said stop-lever H, which is conveniently arranged for the purpose. Strap and other stop devices and foot-levers for adjustment of the cutter's height are common.

By the arrangement herein described of the elastic shoe C, rigidly attached to the rear of the leading-board and hinged near the driving-wheel, taken in connection with the seat-lever F, having its fulcrum on the leading board, as described, I am enabled to apply to more advantage than if the leading-board were hinged to the front of the shoe, and the elastic shoe rigidly attached to the main frame or finger-bar portion thereof, a two-wheel caster, I, arranged under the driver's-seat G, or a little in advance of it, and below the front portion of the leading-board, which carries the swiveling axis $m$ of the caster. The frame of this caster has a socket-projection in front, in which the tongue J is hung by a joint-pin, $n$, for free up-and-down play of the tongue, as is common to numerous vehicles. Nor is any claim here made to the mere introduction of an intermediate piece between the tongue and cutter-beam or front portion of the main frame, as such double connections, forming more or less an intermediate elastic-joint attachment, are well known as common to certain constructions of carriages, the rear end of the tongue being supported by the intermediate piece, and such construction has before been applied to harvesters, including the employment of both single and double swivel-wheel casters or leading-trucks to steady the run of, assist in guiding, and turning the machine, as in running vehicles of various kinds; but in this arrangement it will be observed that the steadiest possible run is secured the caster-wheels in front to enable them to guide and steady the run of the machine, and to turn it when required. Also increased relief or steadiness is given the driver in his advance seat, especially on his applying increased pressure to the seat for the purpose of raising the front portion of the main frame, by reason of (partly) the curved elastic shoe C, rigidly attached at its front to the leading-board, and in rear by joint to the main frame, between the finger-bar and driving-wheel, naturally having but a slight lifting effect upon the leading-board, taken in connection with the counteracting and depressing effect which is thrown upon the leading-board at or near its rear by the fulcrum of the lifting-lever F, said fulcrum having to carry, in addition to the mere weight of the driver on his making the lift on the front of the main frame, a portion of the weight of said main frame and the muscular force or exertion required to overcome and lift said weight, which effect is considerable when the lift is an abrupt one, as is generally the case, whether the lift of the front portion of the main frame be purposely made by the driver to free his machine from an obstacle in the way or by an obstruction striking the shoe; and these several depressing effects, thrown through the fulcrum $g$ of the seat-lever upon the leading-board bearing heavily downward upon the front end of the elastic shoe C, cause said end of the shoe rather to spring forward than be borne or thrown upward, and to urge the leading-board D mostly or altogether slightly forward during the lift of the cutter-bar portion of the main frame (as represented by black and red lines in the diagram marked X in the drawings) to the ease of the draft and steady hold against upward tilt of the leading-board, which carries or has connected with it, as described, the driver's seat and advance guide-wheels.

What I claim as new and useful herein, and desire to secure by Letters Patent, is—

1. Connecting the leading-board D to the main frame A by means of the curved elastic shoe C, rigidly attached at its front to the leading-board, and at its back to the under side of the main frame by joint $c$, in rear of the finger-bar and in front of the driving-wheel when said leading-board serves to carry the fulcrum of the seat-lever F, by which the front of the main frame is raised and lowered, substantially in the manner specified.

2. The combination and arrangement for operation together of the seat-lever F and foot-lever or treadle E, essentially as set forth, for the purposes described.

In testimony whereof I have hereunto subscribed my name.

P. MANNY.

Witnesses:
   M. P. SWEET,
   H. N. HIBBARD.